Dec. 15, 1931. F. C. DILLENBACK 1,837,024
CLOSET SEAT
Filed May 3, 1929
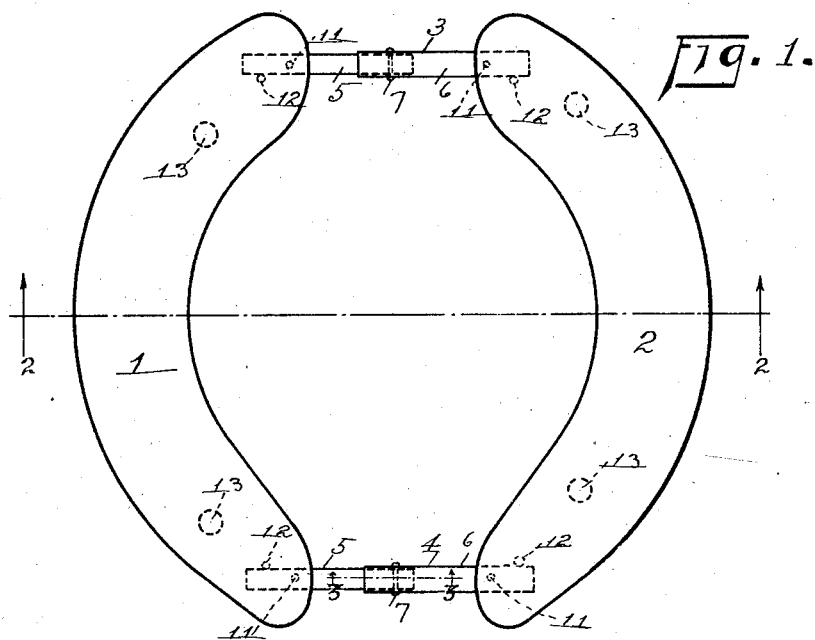
Fig. 1.
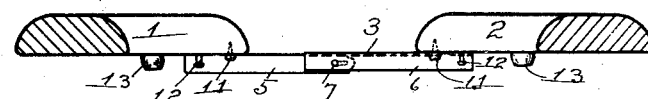
Fig. 2.
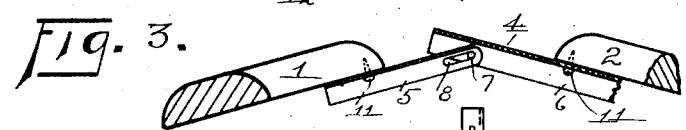
Fig. 3.
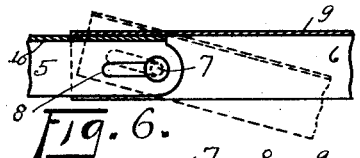
Fig. 6.
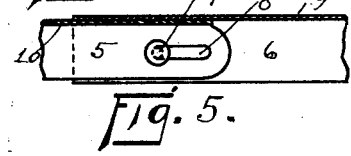
Fig. 5.
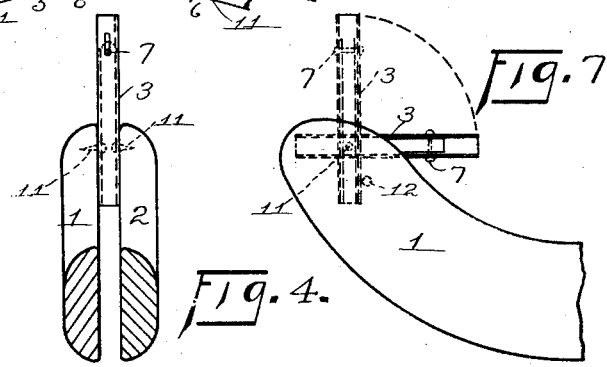
Fig. 4.
Fig. 7.
Witness:
Geo. L. Chapel
INVENTOR
Frank C. Dillenback
BY
Cyrus W. Rice
ATTORNEY Patented Dec. 15, 1931

1,837,024

UNITED STATES PATENT OFFICE

FRANK C. DILLENBACK, OF GRAND RAPIDS, MICHIGAN

CLOSET SEAT

Application filed May 3, 1929. Serial No. 360,149.

The present invention relates to closet seats; and its object is to provide an improved device of that character comprising hingedly-connected members adapted to be readily folded together into compact form for storage and transportation.

This object is attained by, and the invention finds preferable embodiment in, the device hereinafter particularly described in the body of this specification and illustrated by the accompanying drawings, in which:

Figure 1 is a top plan view of a closet seat in extended usable position;

Figure 2 is a transverse vertical sectional view thereof taken on line 2—2 of Figure 1;

Figure 3 is a transverse vertical sectional view of the same taken on the same line 2—2 (the front hinge 4 however being sectioned on line 3—3 of Figure 1) but showing the leaves of the hinge moved relatively to each other from locked-together parallel position and slightly turned about the hinge pintle;

Figure 4 is a transverse vertical sectional view of the same taken on line 2—2 of Figure 1, but showing said leaves and pair of seat members in folded-together position;

Figure 5 is a fragmentary view of the leaves of a hinge sectioned on line 3—3 of Figure 1 and showing the leaves locked together against turning movement in the usable position of the device;

Figure 6 is a like view of the same parts, but showing the leaves unlocked from the position seen in Figure 5 and one of them slightly turned about the hinge pintle as shown in dotted lines; and Figure 7 is a fragmentary top plan view of one of the seat members, illustrating two positions of the hinge turnably connected thereto.

The device illustrated by these drawings comprises a pair of oppositely disposed seat members 1, 2, each of approximately crescent shape. Adjacent their ends these seat members are connected by hinges 3, 4 each of which comprises a pair of leaves 5, 6 turnably mounted on, or connected to, the seat members respectively on their under sides. The leaves of each hinge are connected together turnably about an axis extending in the longitudinal direction of the device, i. e. about the pintle 7 of the hinge. In order that the seat members may be rigidly held in the extended position of use seen in Figures 1 and 2, the leaves 5, 6 of the hinges are locked or held non-turnably about such axis; and preferably by the following means:

One of said leaves, as the leaf 5, has a longitudinal slot 8 in which the pintle (rigidly carried by the other leaf) not only turns but is slidable sidewise. When this pintle is slid in the slot to the position seen in Figure 5, suitable stop portions, viz. the upper sides 9, 10 of the leaves engage each other and hold the leaves against turning movement about the pintle; but when the seat members are moved away from each other, the pintle is carried to the other end of the slot as seen in Figure 6, whereupon the leaves may be turned about the pintle, as indicated in dotted lines in Figure 6, and being farther turned, the seat members and the leaves of the hinges may be folded together in the position shown in Figure 4.

The leaves 5, 6 are turnably connected to the under sides of the seat members respectively, as by the screws 11. When the seat members and leaves of the hinges are thus folded together, as shown in Figure 4, these screws are coaxial or disposed in the same line, so that the hinges whose leaves are thus folded together may now be turned from the position shown in dotted lines in Figure 7 to the position shown in solid lines, thus rendering the device more compact for storage or transportation. Stops 12 may be provided for limiting this turning movement of the hinges. This device is adapted to be carried by travellers and placed upon the usual seats of closets in position for use, and may be provided with the rubber knobs 13.

The invention being intended to be pointed out in the claims, is not to be limited to or by details of construction of the particular embodiment thereof illustrated by the drawings or hereinbefore described.

I claim:

1. In a device of the character described: a pair of oppositely disposed seat members; a hinge comprising a pair of leaves connected together turnably about an axis extending in the longitudinal direction of the device, the leaves being connected to said members respectively turnably about axes concentric in the folded-together position of the leaves.

2. In a device of the character described: a pair of oppositely disposed seat members; a hinge comprising a pair of leaves connected to said members respectively turnably about axes concentric in the folded-together position of the leaves, and connected together turnably in one interrelative slid position of the leaves about an axis extending in the longitudinal direction of the device but non-turnably in another interrelative slid position of the leaves.

3. In a device of the character described: a pair of oppositely disposed seat members; a hinge comprising a pair of leaves connected to said members respectively turnably about axes concentric in the folded-together position of the leaves and connected together by a pintle extending in the longitudinal direction of the device, one of the leaves having a longitudinal slot in which the pintle bears and the leaves having stop portions adapted to engage each other and hold the leaves in one of their interrelative positions against turning movement on the pintle.

4. An auxiliary closet seat composed of two arcuate seat sections, pairs of hinges connecting the sections and consisting of channel members pivotally connected to the respective ends of said sections, said channel members extending beyond the inner edges of the seat sections into overlapping relation, a pintle connecting the overlapped portions of said channel members, thereby permitting said sections to be swung about said pintle to a folded position and permitting said channel members to be swung on their pivotal connections from an outwardly extending position to a position in a longitudinal direction of each of the seat sections.

5. An auxiliary closet seat composed of two arcuate seat sections, pairs of hinges connecting the sections and consisting of channel members attached to the respective ends of said sections, said channel members extending beyond the inner edges of the seat sections into overlapping relation, a slot in the overlapped portion of each pair of said channel members and a pintle in the other of said channel members, said pintle extending through said slot and permitting said channel members to slide toward each other, thereby preventing the channel members from being turned about said pintle, and permitting the channel members to be moved away from each other to be swung on said pintle to fold said sections together.

6. An auxiliary closet seat composed of two arcuate seat sections, pairs of hinges connecting the sections and consisting of channel members pivotally connected to the respective ends of said sections, said channel members extending beyond the inner edges of the seat sections into overlapping relation, a slot in one of the channel members of each pair at their overlapped portions, and a pintle in the other channel member extending through the respective slot, said pintle and slot connection thereby permitting the sections to slide toward each other and prevent folding of the sections and permitting the sections to be moved away from each other to allow said sections to be folded together, thereby assuming a superposed relation with said channel members extending laterally therefrom, said pivotal connection of the channel members permitting them to be swung from their laterally extending position to a position in a direction substantially longitudinally of said folded seat sections.

In testimony whereof I have hereunto set my hand at Grand Rapids, Michigan, this 29th day of April, 1929.

FRANK C. DILLENBACK.